(12) United States Patent
Blinnikka

(10) Patent No.: US 9,148,628 B2
(45) Date of Patent: Sep. 29, 2015

(54) INTELLIGENT MEDIA BUFFERING BASED ON INPUT FOCUS PROXIMITY

(75) Inventor: Tomi Blinnikka, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2249 days.

(21) Appl. No.: 11/840,188

(22) Filed: Aug. 16, 2007

(65) Prior Publication Data

US 2009/0046545 A1    Feb. 19, 2009

(51) Int. Cl.
| | |
|---|---|
| G06F 15/16 | (2006.01) |
| H04N 7/16 | (2011.01) |
| G11B 27/10 | (2006.01) |
| G11B 27/34 | (2006.01) |
| H04N 21/422 | (2011.01) |
| H04N 21/432 | (2011.01) |
| H04N 21/44 | (2011.01) |
| H04N 21/482 | (2011.01) |

(52) U.S. Cl.
CPC .............. *H04N 7/163* (2013.01); *G11B 27/105* (2013.01); *G11B 27/34* (2013.01); *H04N 21/422* (2013.01); *H04N 21/42204* (2013.01); *H04N 21/4325* (2013.01); *H04N 21/44004* (2013.01); *H04N 21/482* (2013.01)

(58) Field of Classification Search
CPC ..................... G06F 17/30899; G06F 17/30902
USPC ......................................................... 709/231
See application file for complete search history.

(56) References Cited

U.S. PATENT DOCUMENTS

| | | | |
|---|---|---|---|
| 6,023,726 A * | 2/2000 | Saksena .......................... 709/219 |
| 6,584,498 B2 * | 6/2003 | Nguyen .......................... 709/219 |
| 7,243,140 B2 | 7/2007 | Gupta | |
| 7,406,090 B2 | 7/2008 | Chen | |
| 7,421,508 B2 | 9/2008 | Hannuksela et al. | |
| 7,558,822 B2 * | 7/2009 | Fredricksen et al. .......... 709/203 |
| 7,747,749 B1 * | 6/2010 | Erikson et al. ................ 709/226 |
| 2001/0030660 A1 * | 10/2001 | Zainoulline ................... 345/720 |
| 2005/0172320 A1 | 8/2005 | Katayama | |
| 2005/0237832 A1 | 10/2005 | Kim et al. | |
| 2006/0047804 A1 * | 3/2006 | Fredricksen et al. ......... 709/224 |
| 2006/0294223 A1 * | 12/2006 | Glasgow et al. .............. 709/224 |
| 2007/0050719 A1 | 3/2007 | Lui et al. | |
| 2007/0250775 A1 * | 10/2007 | Marsico et al. ............... 715/716 |

FOREIGN PATENT DOCUMENTS

TW    I223563    11/2004

OTHER PUBLICATIONS

First official communication, TW Application No. 97131169, dated Aug. 8, 2013, 7 pages.
Claims from TW Application No. 97131169, dated Aug. 2013, 8 pages.

* cited by examiner

*Primary Examiner* — Douglas Blair
(74) *Attorney, Agent, or Firm* — Hickman Palermo Becker Bingham LLP; Edward A. Becker

(57) ABSTRACT

A system and method of pre-buffering media files may be employed to improve the initial playback performance of a media file. In accordance with one aspect, a media player application may present a list of media files for playback. Based on a location and/or movement of an input focus device, the media player may pre-buffer those media files located within a proximity of the input focus device. A pre-buffered media file may be selected for playback by the media player application.

37 Claims, 4 Drawing Sheets

100

INTELLIGENT MEDIA BUFFERING BASED ON INPUT FOCUS PROXIMITY

BACKGROUND

1. Field of the Invention

Aspects of the present invention relate generally to playback of media files, and in particular, pre-buffering of media files to be played based on the proximity of an input focus device.

2. Description of Related Art

As video playback on the Internet, DVRs and mobile devices continues to increase, and available catalogs of media files continue to increase, a major differentiating factor of video services and players will be the user experience, especially the responsiveness and ability to easily preview items in a catalog. The responsiveness of video or audio playback is affected by various factors, such as among other things, the time needed to request and open a video or audio clip, the available bandwidth between a receiving device and a transmitting device, and the amount of memory or cache available to buffer the video clip(s). Buffering multiple video clips also may tax a system's performance, as each clip to be buffered requires caching or storing of data locally. As a result, a video or audio file may experience initial and intermittent performance disruptions during buffering or streaming of the file, thereby preventing a user from experiencing a smooth viewing or listening of the video or audio file.

Thus, it would be desirable to provide a system and method to improve the responsiveness of media file playback while minimizing the amount of data associated with a video clip to be cached.

SUMMARY

Embodiments of the present invention overcome the above-mentioned and various other shortcomings of conventional technology, providing a system and method of pre-buffering media files to improve the initial playback performance of a media file. In accordance with one aspect, a media player application presents a list of media files for playback. Based on a location and/or movement of an input focus device, the media player pre-buffers those media files located within a proximity of the input focus device. A pre-buffered media file is then selected for playback by the media player application.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Figure 1:
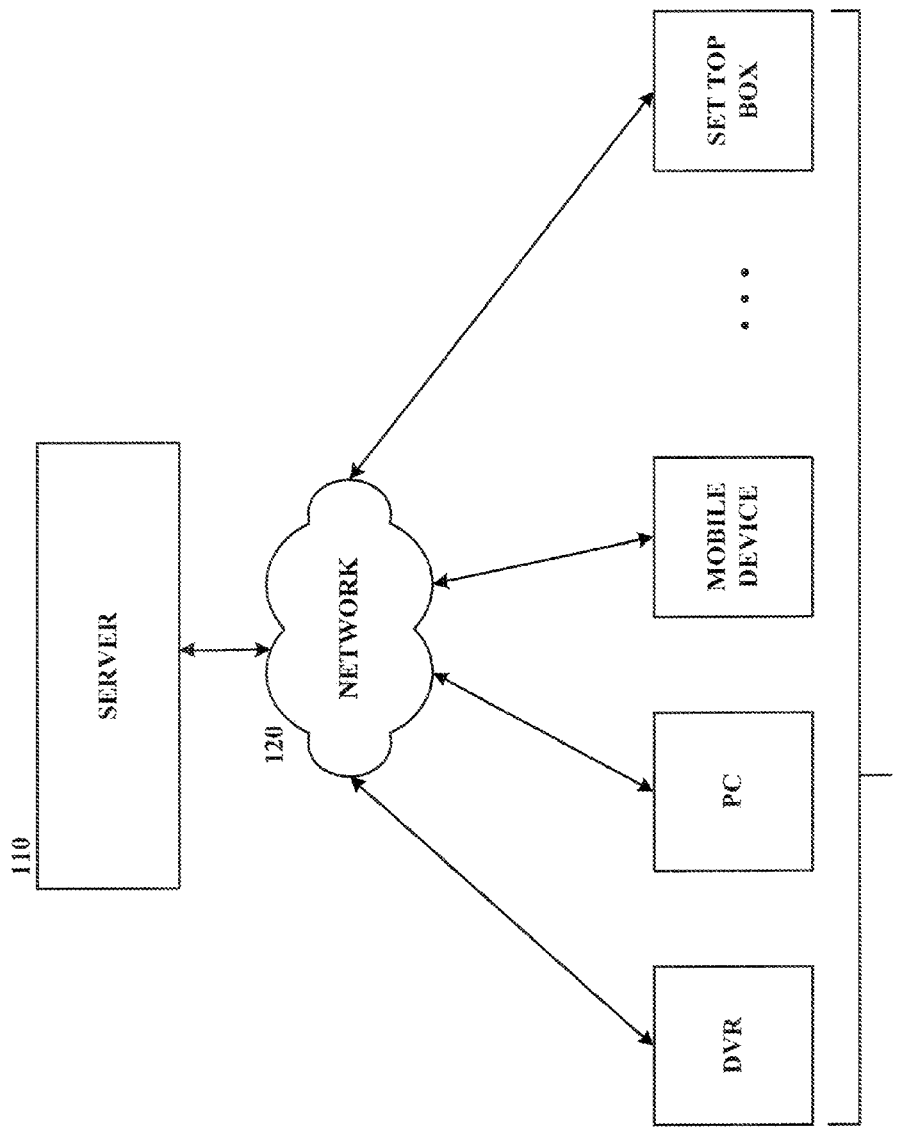
FIG. 1 is a simplified diagram illustrating an embodiment of a system for pre-buffering media files in connected media player devices.

FIG. 1 is a simplified diagram illustrating one embodiment of a multimedia presentation system. The system 100 includes a plurality of devices which can play media files, such as video files or audio files. The media files may be encoded in any format, including but not limited to the mpeg, avi, wmv, mov, wav, mp3, aau, and DivX formats. Various other encoding formats may be used advantageously with the embodiments described herein below; differences between these formats are immaterial to the present discussion unless otherwise noted. The devices may include but are not limited to personal computers, digital video recorders (DVRs) or personal video recorders (PVRs), set top boxes which may receive content through cable, satellite, or Internet Protocol via network infrastructure such as fiber optic cable (e.g., IPTV or Internet television), and mobile devices, such as cell phones, personal digital assistants (PDAs), or other wireless devices capable of playing video files. Each device may function as a standalone media player or may include software to process and play media files. The software may include media player applications (e.g., Windows Media Player, QuickTime Player, or DivX Player) or Internet browsers or other software in which a media player application may be instantiated or embedded, such as for instance, a Java applet or Flash-based player. The system also may include one or more servers, each storing a plurality of media files. In response to a request from a connected device, a server may stream or transfer selected media files over a network to the requesting device.

Figure 2:
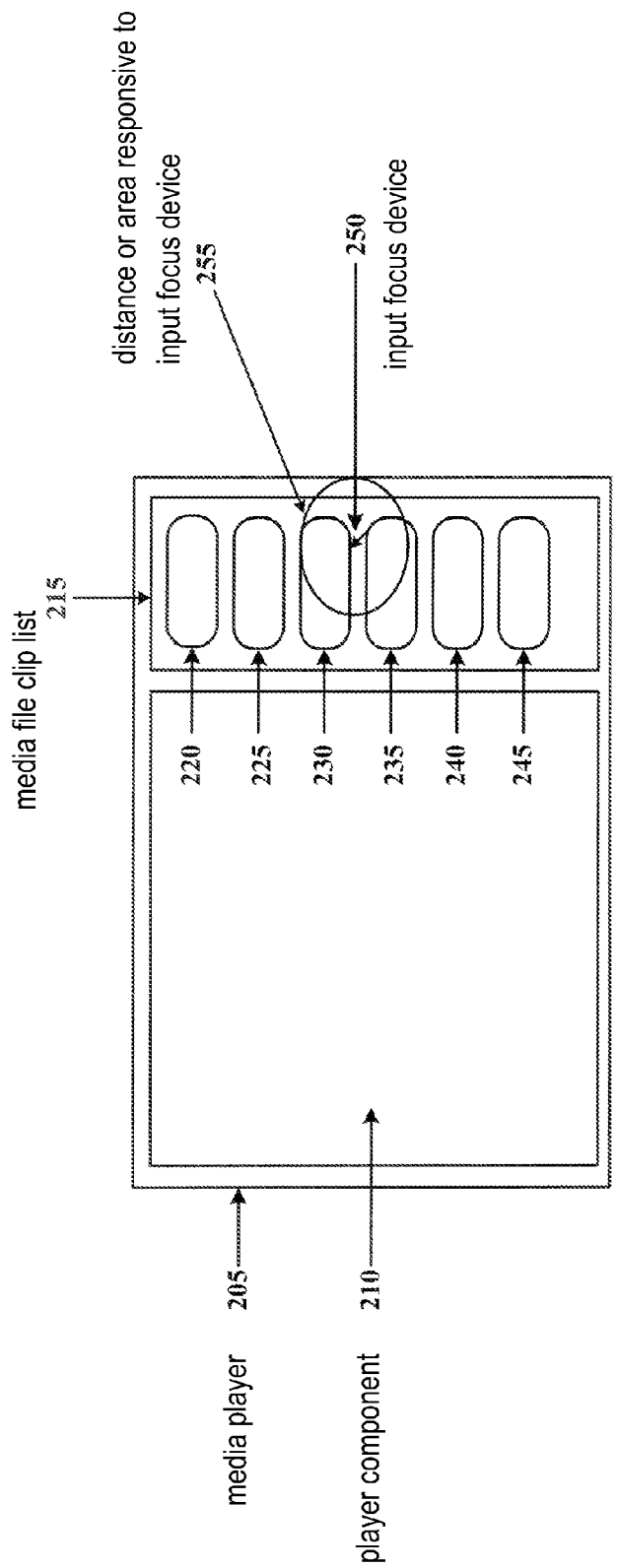
FIG. 2 illustrates an embodiment of a media player application.

FIG. 2 illustrates an embodiment of a media player application. The media player application may execute on any of the plurality of devices previously discussed in connection with FIG. 1, either as a standalone application or as an embedded player within another application, such as an Internet browser. A media player 205 may include a player component 210 that plays a selected media file. Playing the media file may include loading a media file, decoding the media file with an appropriate codec, and playing the media file within a display window. Adjacent to the player component 210, a media file clip list 215 may list other media items available for playback by the player component 210. Each of the media items 220, 225, 230, 235, 240, 245 in the clip list 215 may be listed as text or shown graphically (e.g., a preview or thumbnail of the media item) with accompanying text. A user may control an input focus device 250 to navigate around the media player 205 and select a media item from the clip list 215. In one embodiment, the input focus device 250 may be a pointer controlled by a pointing device, such as a mouse. Alternatively, the input focus device 250 may be a selection tool controlled by a remote control or by buttons on the device itself. The selection tool may traverse the clip list, with a selected clip highlighted or otherwise identified.

Conventionally, when a media file is selected for playback by a media player, the media file is retrieved from storage, either locally or remotely, and loaded by the media player for playback. In the event a media file is stored remotely, the player application may process or parse a hyperlink or identifier of the media item, identify a server storing the media file, perform DNS lookup to identify the IP address of the server, and connect to the server. Those skilled in the art should recognize the specific manner in which the player application connects to a remote source storing a media file is immaterial to the present discussion, and that the aforementioned discussion is merely an example of how a media player may connect and retrieve a media file from a remote source. Before the media player may play the media file, the media player may perform license acquisition activities related to the media file to be played. The media player may either download the entire media file prior to playback or play back the media file as it is being buffered (i.e. stream the media file). If the available bandwidth for streaming or buffering a media file is inadequate, however, a user may experience interruptions or lag in viewing the file.

In one embodiment, to improve initial playback performance of media clips, the media player may pre-buffer media files to improve the initial playback performance. The media files to be pre-buffered may be chosen based on the proximity of the media item listing to the input focus device. If a media item on the clip list 215 is located within a predetermined distance or area 255 from the input focus device 250, the player component may begin pre-buffering the media item in the event that item is selected for playback. In one embodiment, the predetermined area 255 surrounding the input focus device 250 may be calculated as a function of a predetermined radial distance extending from the input focus device 250. The predetermined area 255 shown in FIG. 2 is a circular or elliptical area extending from the input focus device 250 by a predetermined amount.

In the embodiment of FIG. 2, media items 230 and 235 may be pre-buffered by the media player 205 as they are located within the predetermined area 255 surrounding the input focus device 250. To conserve the amount of memory used to store the pre-buffered media items, the media player 205 may only pre-buffer a predetermined amount of data for each of the media items within proximity of the input focus device 250. In this respect, the media player 205 may improve performance of the initial playback of a media file without excessively burdening or occupying available memory resources. In one embodiment, for multiple media items located within the predetermined area 255 surrounding the input focus device 250, the media player application 205 may instantiate multiple player components, with the number of player components instantiated equal to the number of media items to be pre-buffered. The multiple instances of the player components may remain hidden from the user. Each player component may pre-buffer a media item located within the predetermined area. In one embodiment, each player component may pre-buffer a media item in a dedicated buffer stream, such that multiple buffer streams may simultaneously buffer multiple media items.

As the input focus device of FIG. 2 is shown at one instance in time, media items located within the predetermined area 255 surrounding the input focus device 250 may be located outside the predetermined area 255 at a different point in time (e.g., a mouse pointer does not necessarily remain fixed in one location and may move anywhere on a display screen). If a media item is no longer located within the predetermined area 255, in one embodiment, the media player 205 may save the pre-buffered portion of the media item in a temporary storage location such as a cache or buffer (not shown), in the event the item is later selected for playback. Alternatively, the media player 205 may discard the pre-buffered portion of the media item.

In one embodiment, the predetermined area 255 surrounding the input focus device 250 may be diminished by employing vector calculations to more accurately determine a direction of movement of the input focus device 250. A vector may be calculated from two points of the input focus device 250 to determine whether the input focus device 250 is traversing in the direction of a media item or a play button of the player component. If the vector indicates the input focus device 250 is traversing in such a direction, the media player 205 may begin pre-buffering the media item(s) when media item enters the diminished predetermined area surrounding the input focus device 250. In another embodiment, the predetermined area 255 need not be diminished, but the response time and/or pre-buffering capability of the system may be improved by taking advantage of the movement detection just described.

Figure 3:
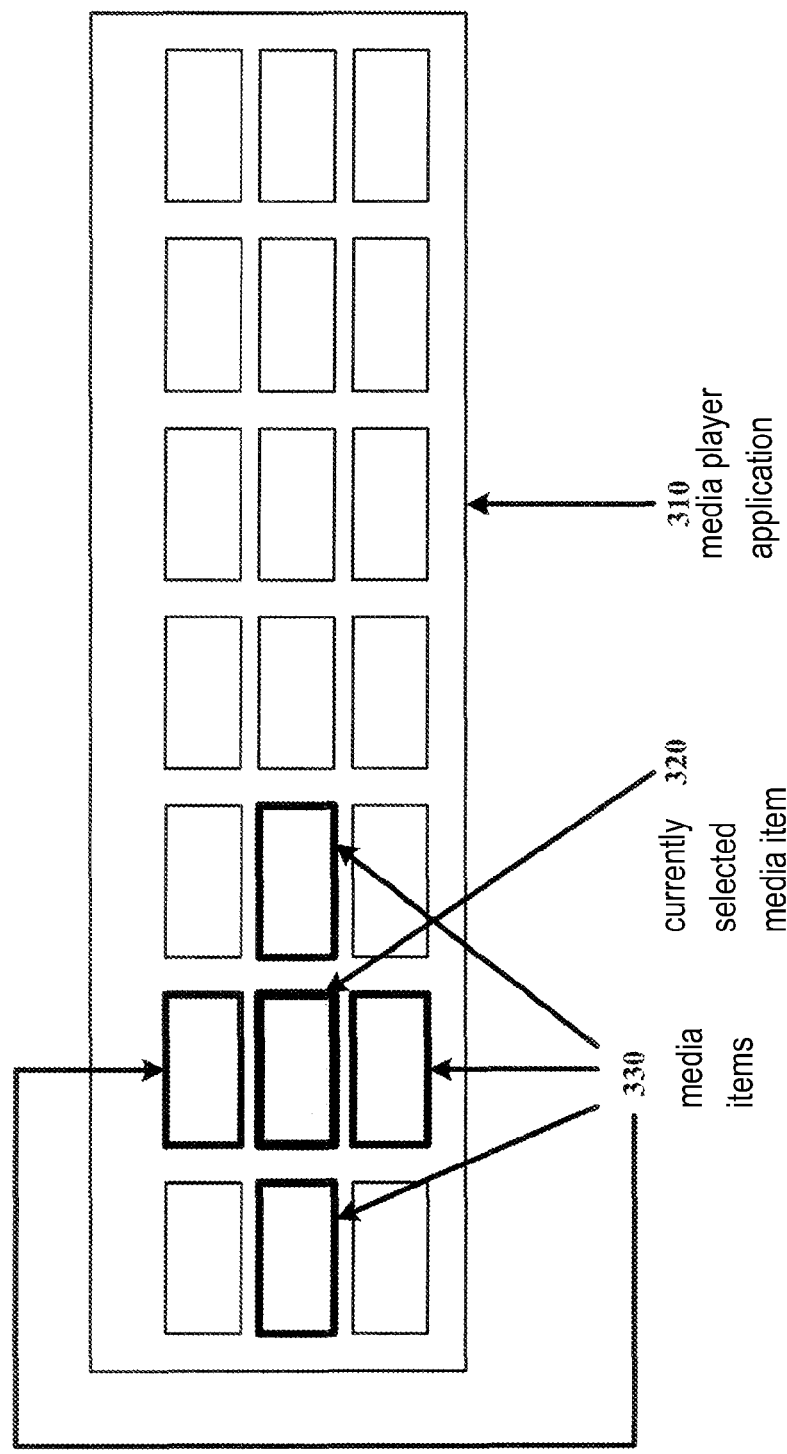
FIG. 3 illustrates an embodiment of a media player application.

FIG. 3 illustrates an embodiment of a media player application. The media player application may be a standalone application used in DVRs or set-top boxes. Alternatively, the media player application may be executed by a processor in a personal computer or mobile device. The media player application may present a set of media items available for playback. In the embodiment of FIG. 3, a menu-style display may show each media item as a thumbnail preview or icon. An input focus device may be a selection tool that traverses the available set of media items in the cardinal directions (i.e., up, down, left, right). These directions may correspond to keys on a keyboard, or direction arrow buttons on a device or a remote control. At any one point in time, the selection tool may highlight or identify for selection a particular media item 320. This media item may be highlighted or otherwise identified as the current media item selection. For a highlighted media selection 320, four adjacent media items 330 also may be highlighted or otherwise identified. These adjacent media items 330 may be adjacent to the current media item selection 320 in the four cardinal directions. The media player application 310 may pre-buffer the currently selected media item 320 and the adjacent media items 330 as the selection tool either may select the currently highlighted item or traverse the clip list to highlight one of the adjacent items for selection. The media player application may pre-buffer a predetermined amount of data for the highlighted media item 320 and each of the adjacent media items 330 to improve the initial playback performance without excessively taxing the memory resources of the device. If the input focus device moves to a different media item, the media player may discard the pre-buffered media items. Alternatively, the media player may retain the pre-buffered media items, in one embodiment, in a temporary storage location, such as a buffer or cache.

Figure 4:
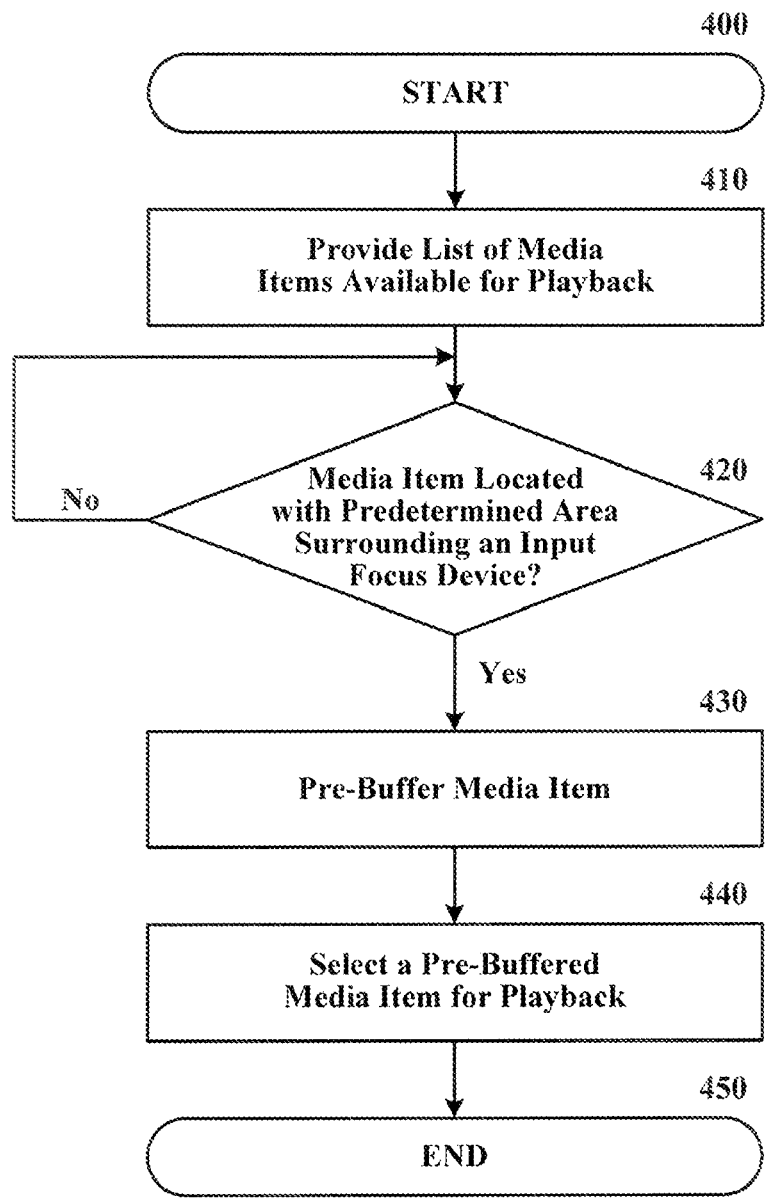
FIG. 4 illustrates an embodiment of a method for pre-buffering media files in a media player.

FIG. 4 illustrates an embodiment of a method for pre-buffering media files in a media player. In block 410, a media player application may present a list of media items available for playback by a player component of the media player. The media items listed each may include a hyperlink or resource identifier identifying the location where the media item is stored. An input focus device, such as a mouse pointer or a selection tool controlled by a remote control, may navigate among the listed media items and select a media item for playback. In decision block 420, the media player may determine whether a media item is located within a predetermined area surrounding the input focus device. If the media item is not located within the predetermined area, the media player may take no action with respect to the media item. If the media item is located within the predetermined area, in block 430, the media player may pre-buffer the media item up to a predetermined amount of data. As discussed earlier, in one embodiment, the outcome of decision block 420 may be determined through detection of movement of the input focus device toward one or more media items.

The media player may pre-buffer the media item due to the increased likelihood that the input focus device may select the media item for playback. If multiple media items listed in the clip list are located partially or wholly within the predetermined area, the media player may pre-buffer each item located partially or wholly in the predetermined area. In block 440, one of the pre-buffered media items may be selected for playback. Playback may commence using the pre-buffered data and may continue as additional data is streamed from the location where the media item is stored.

Those of skill in the art will appreciate that a media player discussed herein may pre-buffer and play back both audio and video files. The present disclosure is not intended to be limited with respect to the number or type of devices capable of connecting to the system, nor the type or format of multimedia content capable of being played by a device. In any event, the inventive system is not intended to be used to violate copyright laws of the United States or other nations and therefore may employ whatever safeguards are needed to comply with such laws.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for playing pre-buffered media items, the method comprising:
    providing a list of media items available for playback by a media player, wherein each media item in the list of media items is selectable by an input focus device, and wherein selection of any media item in the list of media items by the input focus device causes playback of the selected media item on an instance of the media player;
    receiving input from the input focus device that does not select any media item in the list of media items but that satisfies predetermined criteria relative to a plurality of media items in the list of media items;
    in response to receiving the input, performing the following steps in real time:
        pre-buffering each particular media item of the plurality of media items; and
        instantiating an instance of the media player for each particular media item of the plurality of media items, wherein said pre-buffering of each media item of the plurality of media items occurs in the media player instance that was instantiated for the particular media item; and
    in response to second input that selects a particular media item of the plurality of media items, playing the particular media item using the media player instance that was instantiated for the particular media item.

2. The method of claim 1, wherein said pre-buffering buffers a predetermined amount of data for each particular media item of the list of media items that satisfies the predetermined criteria.

3. The method of claim 1, further comprising, responsive to a change in a location of the input focus device,
    ceasing to pre-buffer particular media items of the plurality of media items that do not meet the predetermined criteria, and
    saving said particular media items in a temporary storage location.

4. The method of claim 1, further comprising, responsive to a change in a location of the input focus device,
    ceasing to pre-buffer particular media items of the plurality of media items that do not meet the predetermined criteria, and
    discarding said particular media items.

5. The method of claim 1, wherein each particular media item is pre-buffered in a dedicated buffer stream.

6. The method of claim 1,
    wherein the input focus device is a pointer; and
    wherein the predetermined criteria include a predetermined radius from the pointer.

7. The method of claim 1,
    wherein the input focus device is a selection tool capable of movement in cardinal directions; and
    wherein the predetermined criteria relate to media items adjacent to a media item selected by the selection tool in the cardinal directions.

8. The method of claim 1, wherein the predetermined criteria include a predetermined area surrounding an input focus device location.

9. The method of claim 1,
    wherein the predetermined criteria include a path of movement of the input focus device,
    wherein the path of movement is determined by calculating an input focus device movement vector using two points of the input focus device.

10. A non-transitory computer-readable storage medium encoded with a computer-executable program to perform a method for playing pre-buffered media items, the method comprising:
    providing a list of media items available for playback by a media player, wherein each media item in the list of media items is selectable by an input focus device, and wherein selection of any media item in the list of media items by the input focus device causes playback of the selected media item on an instance of the media player;
    receiving input from the input focus device that does not select any media item in the list of media items but that satisfies predetermined criteria relative to a plurality of media items in the list of media items;
    in response to receiving the input, performing the following steps in real time:
        pre-buffering each particular media item of plurality of media items; and
        instantiating an instance of the media player for each particular media item of the plurality of media items, wherein said pre-buffering each media item of the plurality of media items occurs in the media player instance that was instantiated for the particular media item; and
    in response to second input that selects a particular media item of the plurality of media items, playing the particular media item using the media player instance that was instantiated for the particular media item.

11. The non-transitory computer-readable storage medium of claim 10, wherein said pre-buffering buffers a predetermined amount of data for each particular media item of the list of media items that satisfies the predetermined criteria.

12. The non-transitory computer-readable storage medium of claim 10, further comprising, responsive to a change in a location of the input focus device,
    ceasing to pre-buffer particular media items of the plurality of media items that do not meet predetermined criteria, and
    saving said particular media items in a temporary storage location.

13. The non-transitory computer-readable storage medium of claim 10, further comprising, responsive to a change in a location of the input focus device,
    ceasing to pre-buffer particular media items of the plurality of media items that do not meet the predetermined criteria, and
    discarding said particular media items.

14. The computer-readable storage medium of claim 10, wherein each particular media item is pre-buffered in a dedicated buffer stream.

15. The non-transitory computer-readable storage medium of claim 10,
    wherein the input focus device is a pointer, and
    wherein the predetermined criteria include a predetermined distance from the pointer.

16. The non-transitory computer-readable storage medium of claim 10,
    wherein the input focus device is a selection tool capable of movement in cardinal directions, and
    wherein the predetermined criteria relate to media items adjacent to a media item selected by the selection tool in the cardinal directions.

17. The non-transitory computer-readable storage medium of claim 10, wherein the predetermined criteria include a predetermined area surrounding an input focus device location.

18. The non-transitory computer-readable storage medium of claim 10,
    wherein the predetermined criteria include a path of movement of the input focus device,
    wherein the path of movement is determined by calculating an input focus device movement vector using two points of the input focus device.

19. A media player device comprising:
    one or more processors;
    a player component that is capable of being instantiated into a plurality of instances,
        wherein each instance of the plurality of instances applies to one of the media items of a plurality of media items, and
        wherein a particular instance of the plurality of instances plays a particular media item in response to a selection of the particular media item;
    an input focus device that provides input that does not select any media item in the list of media items but that satisfies predetermined criteria relative to the plurality of media items included in a list of media items, and that provides second input that selects a particular media item of the plurality of media items, wherein selection of the particular media item by the second input causes playback of the selected media item on the particular instance of the media component that was instantiated for the particular media item; and
    a media cache that pre-buffers the plurality of media items in response to input from the input focus device that satisfies the predetermined criteria.

20. The media player device of claim 19, wherein each item in the list of media items includes a URL identifying the corresponding media item stored remotely from the media player.

21. The media player device of claim 20, wherein said media cache pre-buffers a predetermined amount of data for each particular media item of the plurality of media items that satisfies the predetermined criteria.

22. The media player device of claim 19, wherein, responsive to a change in a location of said input focus device,
    said media cache ceases pre-buffering particular media items of the plurality of media items that do not meet the predetermined criteria, and
    said media cache saves said particular media items.

23. The media player device of claim 19, wherein, responsive to a change in a location of said input focus device,
    said media cache ceases pre-buffering particular media items of the plurality of media items that do not meet the predetermined criteria, and
    said media cache discards said particular media items.

24. The media player device of claim 19, wherein each particular media item that said media cache pre-buffers is provided in a dedicated buffer stream.

25. The media player device of claim 19,
    wherein the input focus device is a pointer, and
    wherein the predetermined criteria include a predetermined distance from the pointer.

26. The media player device of claim 19,
    wherein the input focus device is a selection tool capable of movement in cardinal directions, and
    wherein the predetermined criteria relate to media items adjacent to a media item selected by the selection tool in the cardinal directions.

27. The media player device of claim 19, wherein the predetermined criteria include a predetermined area surrounding an input focus device location.

28. The media player device of claim 19,
    wherein the predetermined criteria include a path of movement of the input focus device, and
    wherein the path of movement is determined by calculating an input focus device movement vector using two points of the input focus device.

29. A multimedia presentation system comprising:
    at least one server to store a plurality of media files; and
    a plurality of devices configured to connect to said at least one server, each device comprising:
        one or more processors;
        a media player comprising:
            a player component that is capable of being instantiated into a plurality of instances,
                wherein each instance of the plurality of instances applies to one of the media items of a plurality of media items, and
                wherein a particular instance of the plurality of instances plays a particular media item in response to a selection of the particular media item;
            an input focus device that provides input that does not select any media item in the list of media items but that satisfies predetermined criteria relative to the plurality of media items included in a list of media items, and that provides second input that selects a particular media item of the plurality of media items, wherein selection of the particular media item causes playback of the selected media item on the particular instance of the media component that was instantiated for the particular media item; and
            a media cache that pre-buffers the plurality of media items in response to input from the input focus device that satisfies the predetermined criteria.

30. The multimedia presentation system of claim 29, wherein said media cache pre-buffers a predetermined amount of data for each particular media item of the plurality of media items that satisfies the predetermined criteria.

31. The multimedia presentation system of claim 29, wherein, responsive to a change in a location of said input focus device,
    said media cache ceases pre-buffering particular media items of the plurality of media items that do not meet the predetermined criteria, and
    said media cache saves said particular media items.

32. The multimedia presentation system of claim 29, wherein, responsive to a change in a location of said input focus device, said media cache ceases pre-buffering the particular media items of the plurality of media items that do not meet the predetermined criteria, and said media cache discards said particular media items.

33. The multimedia presentation system of claim 29, wherein each particular media item that said media cache pre-buffers is provided in a dedicated buffer stream.

34. The multimedia presentation system of claim 29,
wherein the input focus device is a pointer, and
wherein the predetermined criteria include a predetermined distance from the pointer.

35. The multimedia presentation system of claim 29,
wherein the input focus device is a selection tool capable of movement in cardinal directions, and
wherein the predetermined criteria relate to media items adjacent to a media item selected by the selection tool in the cardinal directions.

36. The multimedia presentation system of claim 29, wherein the predetermined criteria include a predetermined area surrounding an input focus device location.

37. The multimedia presentation system of claim 29,
wherein the predetermined criteria include a path of movement of the input focus device,
wherein the path of movement is determined by calculating an input focus device movement vector using two points of the input focus device.

* * * * *